(12) United States Patent
van Willigenburg

(10) Patent No.: US 7,796,521 B2
(45) Date of Patent: Sep. 14, 2010

(54) METHOD AND APPARATUS FOR POLICING BANDWIDTH USAGE FOR A HOME NETWORK

(75) Inventor: Willem van Willigenburg, Hilversum (NL)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 625 days.

(21) Appl. No.: 11/558,089

(22) Filed: Nov. 9, 2006

(65) Prior Publication Data

US 2008/0112320 A1 May 15, 2008

(51) Int. Cl.
*H04J 3/14* (2006.01)

(52) U.S. Cl. .................. 370/236; 370/235; 370/468

(58) Field of Classification Search .......... 370/229, 370/230, 230.1, 232, 235, 236, 237, 395.41, 370/395.42, 414, 418, 468; 709/223–226
See application file for complete search history.

(56) References Cited

U.S. PATENT DOCUMENTS

| 5,463,620 | A | * | 10/1995 | Sriram | 370/412 |
| 6,188,671 | B1 | * | 2/2001 | Chase et al. | 370/232 |
| 6,529,475 | B1 | * | 3/2003 | Wan et al. | 370/231 |
| 6,848,004 | B1 | * | 1/2005 | Chang et al. | 709/232 |
| 6,973,033 | B1 | * | 12/2005 | Chiu et al. | 370/230.1 |
| 6,980,520 | B1 | * | 12/2005 | Erimli | 370/236 |
| 7,061,868 | B1 | * | 6/2006 | Ahlfors et al. | 370/236 |
| 2006/0146874 | A1 | | 7/2006 | Yuan et al. | |
| 2007/0253415 | A1 | * | 11/2007 | Chase et al. | 370/389 |

FOREIGN PATENT DOCUMENTS

WO WO 2005/122500 A 12/2005
WO WO 2006/116483 A 11/2006

OTHER PUBLICATIONS

International Search Report & Written Opinion corresponding PCT/US2007/023360, Mar. 7, 2008, Lucent Technologies Inc.

* cited by examiner

*Primary Examiner*—Donald L Mills
(74) *Attorney, Agent, or Firm*—Wall & Tong, LLP

(57) ABSTRACT

The invention includes a method and apparatus for policing a home network having a plurality of terminals. At a gateway between the home network and an access network, a method includes monitoring bandwidth usage associated with intra-network traffic, determining bandwidth requirements associated with inter-network traffic, and, in response to a determination that the bandwidth usage prevents satisfaction of one of the bandwidth requirements, transmitting data adapted to reduce intra-network traffic.

20 Claims, 5 Drawing Sheets

METHOD AND APPARATUS FOR POLICING BANDWIDTH USAGE FOR A HOME NETWORK

FIELD OF THE INVENTION

The invention relates to the field of communication networks and, more specifically, to residential gateways and associated home networks.

BACKGROUND OF THE INVENTION

A home network typically includes one or more user terminals that may access the Internet via an access network. A residential gateway is typically positioned between the home network and the access network in order to facilitate communications between the user terminals of the home network and network elements outside of the home network, and to provide network-offered services to the user terminals. A home network may be implemented as a local area in which no quality-of-service (QOS) mechanism is available (i.e., each user terminal is free to use the bandwidth of the home network). Disadvantageously, however, since no QOS mechanism is available in the home network, bandwidth of the home network consumed by communications between user terminals of the home network may result in insufficient bandwidth for communications to and from the home network via the residential gateway.

SUMMARY OF THE INVENTION

Various deficiencies in the prior art are addressed through the invention of a method and apparatus for policing a home network having a plurality of terminals. At a gateway between the home network and an access network, a method includes monitoring bandwidth usage associated with intra-network traffic, determining bandwidth requirements associated with inter-network traffic, and, in response to a determination that the bandwidth usage prevents satisfaction of one of the bandwidth requirements, transmitting data adapted to reduce intra-network traffic.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention enables policing of bandwidth usage of a network. The present invention monitors the bandwidth usage on the home network due to communications between terminals on the home network. The present invention further monitors bandwidth requirements of traffic flows between the home network and one or more access networks in communication with the home network via a gateway device. The present invention, in response to a determination that the bandwidth usage due to communications between terminals of the home network prevents one or more of the bandwidth requirements of the traffic flows from being satisfied, initiates a frame (which may also be referred to herein as a control frame or a backpressure frame) to a selected one or more of the terminals on the home network such that the selected terminals stop transmitting for a period of time, thereby increasing bandwidth available on the home network for use by the traffic flows between the home network and the access network.

Figure 1:
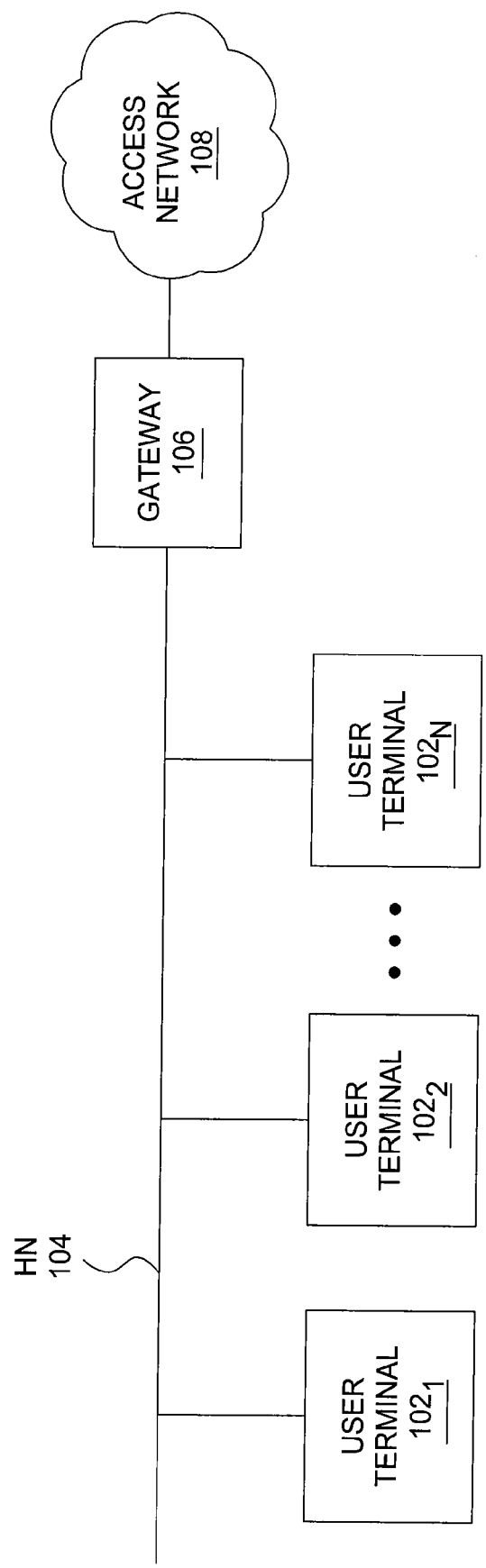
FIG. 1 depicts a high-level block diagram of a communication network.

FIG. 1 depicts a high-level block diagram of a communication network. Specifically, communication network 100 of FIG. 1 includes a plurality of user terminals (UTs) $102_1$-$102_N$ (collectively, UTs 102), a home network (HN) 104, a gateway (GW) 106, and an access network (AN) 108. The UTs 102 communicate using HN 104 (i.e. denoted as intra-HN communications, or more generally as intra-network communications, between UTs 102). The UTs 102 communicate with AN 108 using HN 104 and GW 106. Although primarily depicted and described with respect to a specific number of UTs 102 coupled via one HN 104, GW 106 may provide various functions of the present invention for any number of HNs supporting any number of UTs.

The UTs 102 include terminals adapted for transmitting and receiving information. The UTs 102 are adapted for transmitting frames over HN 104 and receiving frames over HN 104. The UTs 102 may transmit frames to other UTs 102 on HN 104 and to other network elements available via GW 106 and AN 108. Similarly, UTs 102 may receive frames from other UTs 102 on HN 104 and from other network elements available via GW 106 and AN 108. In one embodiment, in which HN 104 operates as a shared network, each UT 102 is adapted for processing frames intended for that UT 102 and ignoring frames intended for other network elements (e.g., intended for other UTs 102 on HN 104 or for one or more other network elements available via GW 106 and AN 108). The operation of UTs 102 may be better understood with respect to FIG. 2. For example, UTs 102 may include desktop computers, laptop computers, and the like.

The HN 104 facilitates intra-network communications between UTs 102 and inter-network communications between UTs 102 and various other network elements available via GW 106 and AN 108. The HN 104 functions as a shared network such that each frame transmitted over HN 104 is received by each network element connected to HN 104 (illustratively, each of the UTs 102 and GW 106). In other words, HN 104 functions as a shared network such that, at any given time, information may be transmitted over HN 104 by only one network element connected to HN 104 (illustratively, one of the UTs 102 or GW 106). The operation of HN 104 may be better understood with respect to FIG. 2.

The GW 106 facilitates communications between UTs 102 and AN 108. For example, GW 106 may be a residential gateway. The GW 106 is adapted for monitoring bandwidth usage on HN 104. The GW 106 is further adapted for monitoring a required bandwidth necessary for supporting each traffic flow traversing GW 106. The GW 106 is adapted for initiating control frames to ones of the UTs 102 in order to prevent the ones of the UTs 102 from transmitting on HN 104 for a period of time (in order to enable inter-network traffic flows between UTs 102 and AN 108 to utilize available bandwidth on HN 104. The operation of GW 106 in policing bandwidth usage of HN 104 may be better understood with respect to FIG. 2 and FIG. 3.

The AN 108 includes any access network adapted for facilitating communications between UTs 102 and various other network elements in various other networks (not depicted). The AN 108 supports traffic flows having associated quality-of-service levels. For example, AN 108 may support various services such as content streaming (e.g., streaming audio, streaming video, and the like, as well as various combinations thereof), gaming, instant messaging, and the like, as well as various combinations thereof. For example, AN 108 may include a cable access network, a digital subscriber line (DSL) access network, and the like.

Figure 2:
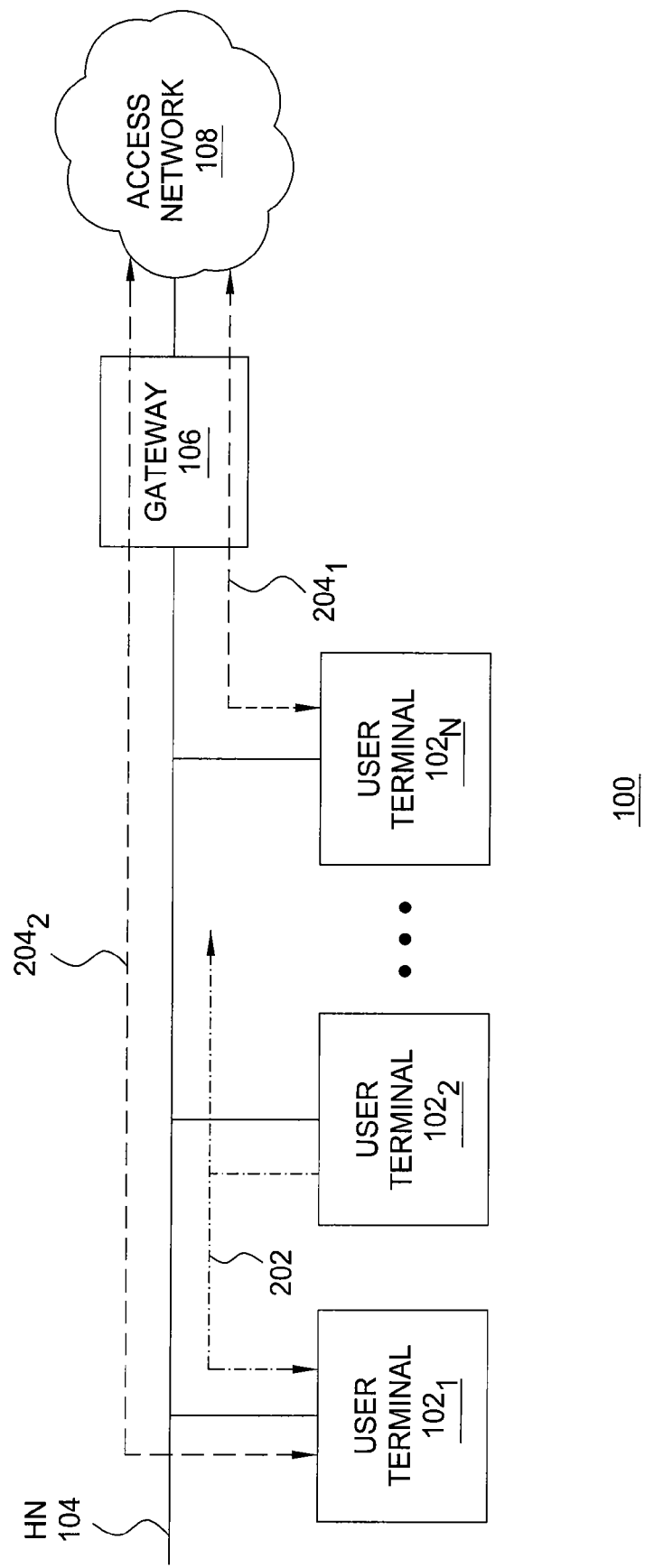
FIG. 2 depicts a high-level block diagram of the communication network of FIG. 1.

FIG. 2 depicts a high-level block diagram of a communication network (illustratively, communication network 100 of FIG. 1) supporting one intra-network traffic flow and two inter-network traffic flows. As depicted in FIG. 2, communication network 100 supports intra-network communication 202. As depicted in FIG. 2, communication network 100 supports a first inter-network traffic flow $204_1$ and a second inter-network traffic flow $204_2$ (collectively, inter-network traffic flows 204). Although primarily depicted and described herein with respect to a HN supporting one intra-network transmission and two inter-network traffic flows, the present invention may be used to control bandwidth usage of a home network supporting any number of intra-network transmissions and any number of inter-network traffic flows.

As depicted in FIG. 2, the intra-network communication 202 includes frames transmitted from UT $102_2$ intended for UT $102_1$. For intra-network communication 202, frames transmitted by UT $102_2$ intended for UT $102_1$ are placed on HN 104 such that each frame is received by intended UT $102_1$, as well as by other UTs 102 coupled to HN 104 (illustratively, UT $102_N$) and GW 106 coupled to HN 104. Since frames transmitted by UTs 102 over HN 104 are received by GW 106, GW 106 may continuously monitor the bandwidth usage of HN 104 associated with communications between UTs 102.

As depicted in FIG. 2, the inter-network traffic flows 204 include traffic flows between UTs 102 of HN 104 and AN 108 (enabling UTs 102 of HN 104 to communication with other network elements not directly coupled to HN 104). Specifically, as depicted in FIG. 2, the first inter-network traffic flow $204_1$ is a traffic flow between UT $102_N$ and AN 108 via GW 106 and second inter-network traffic flow $204_2$ is a traffic flow between UT $102_1$ and AN 108 via GW 106. The inter-network traffic flows 204 have associated quality-of-service levels such that each inter-network traffic flow requires a certain amount of bandwidth on HN 104 in order to maintain the associated quality-of-service level.

As described herein, GW 106 operates as a bandwidth control module. The GW 106 monitors bandwidth usage on HN 104 due to communications between UTs 104 (illustratively, intra-network communication 202). The GW 106 monitors bandwidth requirements of respective inter-network traffic flows (illustratively, inter-network traffic flows 204). The GW 106, in response to a determination that a bandwidth requirement associated with one of the inter-network traffic flows is not satisfied (or, alternatively, may be prevented from being satisfied), issues at least one control frame adapted to reduce the bandwidth usage on HN 104 due to intra-HN communications between UTs 104 such that more of the available bandwidth of HN 104 may be utilized by inter-network traffic flows for maintaining the required quality-of-service of each of the inter-network traffic flows.

In one example, described within the context of FIG. 2, assume that total available bandwidth on HN 104 is 100 Mbps. In this example, further assume that bandwidth requirements for first inter-network traffic flow $204_1$ and second inter-network flow $204_2$ are 35 Mbps and 25 Mbps, respectively. In this example, remaining bandwidth associated with HN 104 which may be used for intra-network communications between UTs 102 is 40 Mbps. In this example, in response to a determination that intra-network communication 202 from UT $102_2$ to UT $102_1$ exceeds 40 Mbps, GW 106 initiates a control frame to UT $102_2$ that is adapted to cause UT $102_2$ to stop transmitting over HN 104 for a predetermined amount of time. The operation of GW 106 may be better understood with respect to FIG. 3.

Figure 3:
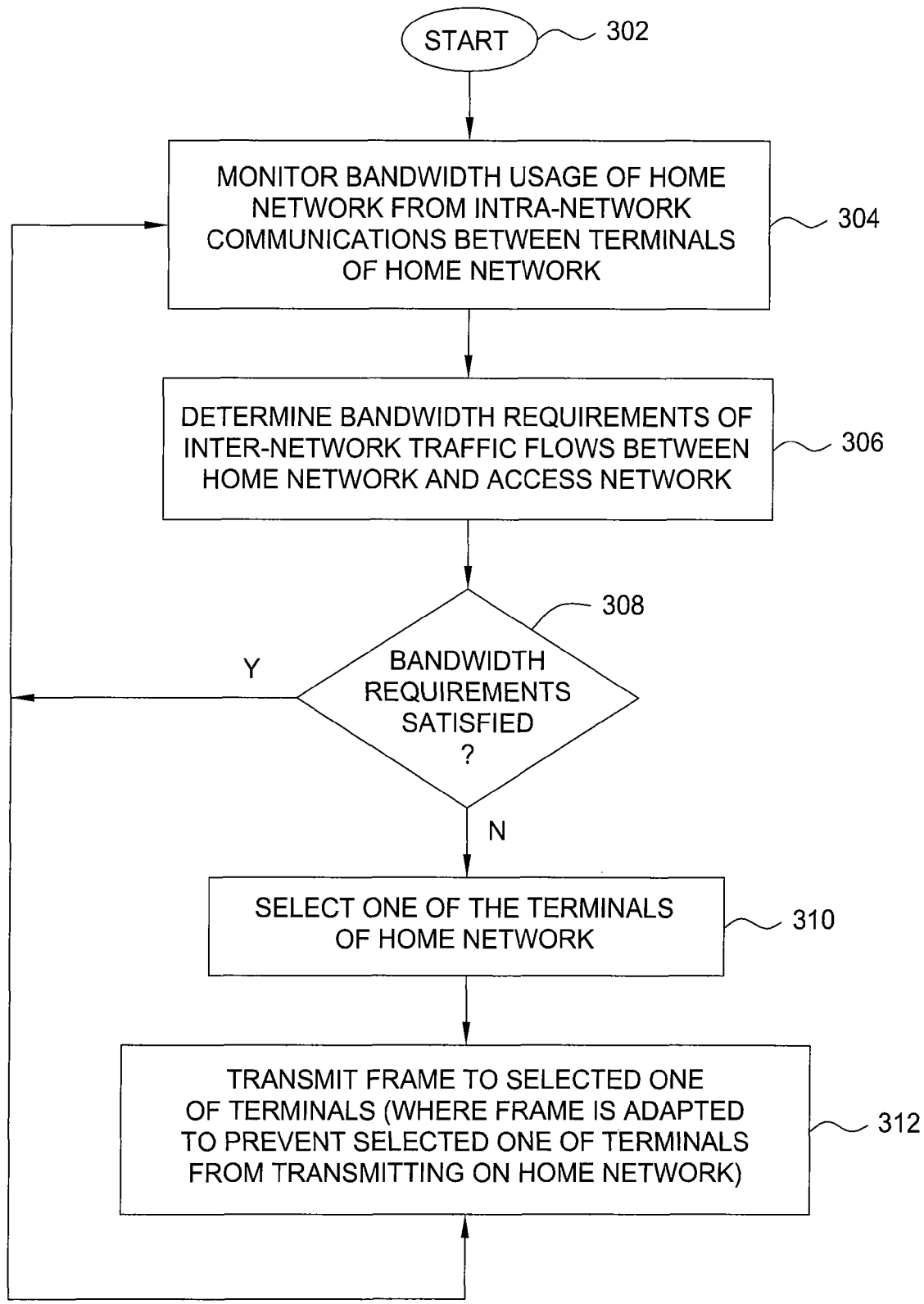
FIG. 3 depicts a method according to one embodiment of the present invention.

FIG. 3 depicts a method according to one embodiment of the present invention. Specifically, method 300 is a method for initiating a control frame adapted to prevent a selected one of a plurality of user terminal on a home network from transmitting to other user terminals on the home network. The control frame is initiated in response to a determination that bandwidth usage on the home network due to communications between terminals of the home network prevents a bandwidth requirement associated with a traffic flow from being satisfied. Although primarily depicted and described herein as being performed serially, at least a portion of the steps of method 300 may be performed contemporaneously, or in a different order than presented in FIG. 3. The method 300 begins at step 302 and proceeds to step 304.

At step 304, bandwidth usage is monitored. The monitored bandwidth usage is the bandwidth usage associated with intra-network communications (i.e., bandwidth usage due to communications between UTs of the HN). In one embodiment, bandwidth usage is monitored by receiving frames placed on the HN by UTs of the HN (since the GW receives all frames placed on the HN by any of the UTs of the HN (although not addressed at the GW)), identifying the UT from which each received frame originates, and monitoring a bandwidth usage measure for each UT according to each of the received frames. In one embodiment, monitoring a bandwidth usage measure for each of the UTs includes determining a size of each received frame, determining a length of time during which each UT transmits each received frame, and determining the bandwidth usage measure for each UT using the frame sizes and the frame transmission times.

At step 306, bandwidth requirements associated with inter-network traffic are determined. In one embodiment, bandwidth requirements associated with inter-network traffic include bandwidth requirements associated with respective traffic flows between the HN (i.e., UTs of the HN) and the AN. In one embodiment, determining the bandwidth requirements of the traffic flows includes identifying each traffic flow between the HN and the AN, determining a priority of each identified traffic flow, and determining the bandwidth requirement of each traffic flow using the priority of the traffic flow. In one embodiment, the priority of a traffic flow is determined using one or more quality-of-service (QOS) indicators provided in the frames of that traffic flow. The QOS indicator(s) may be determined from the headers (or other information) of the respective traffic flows.

At step 308, a determination is made as to whether the bandwidth requirements of the inter-network traffic (e.g., of the respective traffic flows) are satisfied. If the bandwidth requirements of the inter-network traffic are all satisfied (e.g., there is sufficient bandwidth available on the HN to support the bandwidth requirements of the each of the respective traffic flows between the HN and the AN), method 300 returns to step 304. If bandwidth requirements of the inter-network traffic are not satisfied (e.g., there is insufficient bandwidth available on the HN to support the bandwidth requirements of all of the traffic flows between the HN and the AN; i.e., one or more bandwidth requirements is not satisfied), method 300 proceeds to step 310.

At step 310, one of the UTs of the home network is selected (as the UT that will be prevented from communicating over the HN for a period of time in order to increase the bandwidth available on the HN for supporting the traffic flows between the HN and the AN). In one embodiment, the selected one of the UTs is selected according to a bandwidth usage measure associated with each of the respective UTs of the HN. As described herein, in one such embodiment, the bandwidth usage measures of the UTs may be determined by determining a length of time during which each UT transmits each received frame, and determining the bandwidth usage measure for each UT using the frame sizes (which may be measured in bits, bytes, or any other units of frame size measurement) and the frame transmission times.

In one embodiment, selection of one of the UTs using bandwidth usage measures may include sorting the bandwidth usage measures of each of the terminals on the HN. In one such embodiment, the UT currently utilizing the largest amount of bandwidth for intra-network communications may be selected for preventing that UT from communicating over the HN. In another such embodiment, the UT currently utilizing the smallest amount of bandwidth for intra-network communications may be selected for preventing that UT from communicating over the HN.

Although primarily described with respect to embodiments in which the selected UT is selected according to bandwidth usage measures associated with each of the UTs, in other embodiment, the UT may be selected using other information. In one embodiment, for example, the UT may be selected using at least one of priority information associated with the intra-network traffic of each of the UTs, quality-of-service information associated with the intra-network traffic of each of the UTs, and the like, as well as various combinations thereof.

Although primarily depicted and described herein with respect to selecting one of the UTs as the UT to be prevented from communicating over the HN, in other embodiments multiple UTs may be selected as UTs to be prevented from communicating over the HN. For example, preventing one UT from communicating over the HN may not provide enough bandwidth to support the bandwidth requirements of the traffic flows, in which case, one or more additional UTs may also be prevented from communicating over the HN. In one embodiment, in which multiple UTs are selected as UTs to be prevented from communicating over the HN, the selection of the multiple UTs may be performed using one or more of a plurality of selection schemes.

At step 312, data adapted for reducing intra-network traffic between UTs is transmitted over the HN. In one embodiment, the data adapted for reducing intra-network traffic is initiated by the GW between the HN on which the UTs communicate and the AN. In one embodiment, the data adapted for reducing intra-network traffic is transmitted to the selected one (or more) of the UTs. In one embodiment, the data is adapted to prevent the selected UT from transmitting on the HN for a period of time. In one embodiment, the data adapted for reducing intra-network traffic is a frame (also referred to herein as a control frame or a backpressure frame) that is transmitted to the selected one of the UTs of the HN.

In one embodiment, initiating the control frame to the selected one of the UTs includes identifying the selected one of the UTs, identifying another one of the UTs for which the frames transmitted by the selected one of the UTs over the HN are intended, and generating the control frame using the identified UTs. In one such embodiment, the generated control frame includes a source address (which identifies the other one of the UTs) and a destination address (which identifies the selected one of the UTs). In this embodiment, the GW generates the control frame such that the selected one of the UTs deems the control frame to have been sent from the other one of the UTs (i.e., from the UT to which the selected one of the UTs had been transmitting frames over the HN).

In one embodiment, the control frame may be any format adapted for preventing one or more selected UT(s) from transmitting on the HN for a period of time. In one embodiment, in which the HN is implemented as a local area network (LAN), the control frame may be a PAUZE frame, or an adapted form of a PAUZE frame. In one embodiment, in which the HN is implemented as a different type of network (e.g., a token ring network), the control frame may be implemented using another format adapted for preventing one or more selected UT(s) from transmitting on the HN for a period of time. In one or more other embodiments, various other frames, packets, datagrams, and the like, as well as various other forms of signaling, may be used for preventing one or more selected UT(s) from transmitting on the HN for a period of time.

As depicted in FIG. 3, from step 312, method 300 returns to step 304 (although it should be noted that steps 304, 306, and 308 of method 300 continue to be performed as steps 308 and 310 of method 300 are performed, as described below). The operation of a selected UT in response to receiving the data adapted for reducing intra-network traffic is depicted and described herein with respect to FIG. 4. Although primarily depicted and described with respect to a control frame, as described herein with respect to FIG. 3, various other forms of data, or other types of signaling, may be used by a GW in order to reduce intra-network traffic between UTs of the HN.

Although depicted and described as being performed serially, the steps of monitoring the bandwidth usage of the HN (step 304), determining the bandwidth requirements of the traffic flows (step 306), and determining whether or not the bandwidth requirements of the respective traffic flows are satisfied (step 308) may be continuously performed in a contemporaneous manner. Furthermore, the steps of monitoring the bandwidth usage of the HN (step 304), determining the bandwidth requirements of the traffic flows (step 306), and determining whether or not the bandwidth requirements of the respective traffic flows are satisfied (step 308) continue to be performed as the selected one (or more) of the terminals is prevented from transmitting over the HN.

Figure 4:
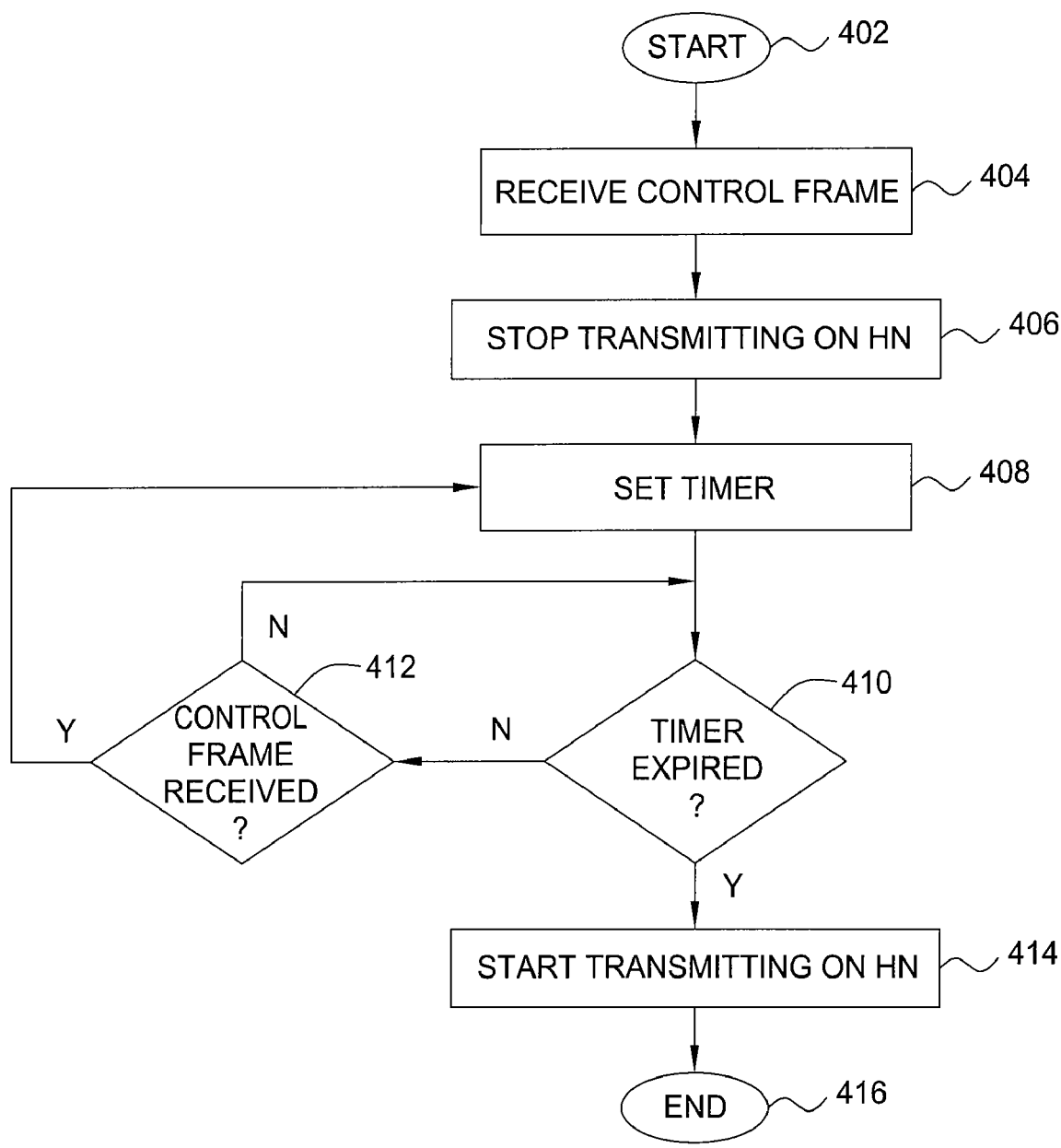
FIG. 4 depicts a method according to one embodiment of the present invention.

FIG. 4 depicts a method according to one embodiment of the present invention. Specifically, method 400 is a method for preventing transmission over a HN in response to a control frame received from a GW, where the GW is adapted for controlling bandwidth usage on the HN. Although primarily depicted and described with respect to use of a generic control frame, any frame or other packet, message, data, signals, and the like may be used for controlling bandwidth usage on the HN. Although primarily depicted and described herein as being performed serially, at least a portion of the steps of method 400 may be performed contemporaneously, or in a different order than presented in FIG. 4. The method 400 begins at step 402 and proceeds to step 404.

At step 404, a control frame is received. The control frame is received at a UT (illustratively, one of UTs 102) from a gateway (illustratively, GW 106). The control frame is generated such that the receiving UT deems the control frame to be received from another user terminal (illustratively, another one of the UTs 102). The control frame is adapted to prevent the receiving UT from transmitting over the HN to which the receiving UT and the GW are coupled. At step 406, the receiving UT stops transmitting information over the HN, thereby enabling more of the available bandwidth of the HN to support inter-network communications associated with traffic flows between other UTs coupled to the HN and various other network elements available via an associated access network (illustratively, AN 108).

At step 408, the receiving UT sets a timer. The timer specifies the length of time for which the receiving UT is to stop transmitting over the HN. In one embodiment, the length of time to which the timer is set is configured on the receiving UT such that, upon receiving the control frame, the timer begins counting the preconfigured length of time (e.g., counting up or counting down). In another embodiment, the length of time to which the timer is set is configured by the receiving UT using information included within the control frame. The length of time for which the receiving UT is to stop transmitting over the HN may be determined in various other manners.

At step 410, a determination is made as to whether or not the timer has expired. If the timer has not expired, method 400 proceeds to step 412. At step 412, a determination is made as to whether or not another control frame is received by the UT. If another control frame is not received, method 400 returns to step 410 (i.e., the timer continues to count down toward expiration as the UT monitors for the arrival of another control frame). If another control frame is received, method 400 returns to step 408 (i.e., the timer is reset in response to the additional control frame). If the timer has expired, method 400 proceeds to step 414. At step 414, since another control frame is not received by the UT before expiration of the timer, the UT starts transmitting on the HN again. At step 416, method 400 ends.

Although primarily depicted and described with respect to an explicit step of determining whether or not the timer has expired, it should be noted that the timer may merely just count down such that there is no continuously performed step of determining whether the counter has expired. In one such embodiment, the receiving UT merely monitors for another control frame as the timer counts down toward expiration. If the timer reaches expiration prior to another control frame being received, the UT may begin transmitting over the HN to other UTs (i.e., may resume intra-network communication with other UTs on the HN). By contrast, if another control frame is received before the timer expires, the UT continues to prevent transmissions over the HN and resets the timer.

Although primarily depicted and described with respect to reducing intra-network traffic in order to enable satisfaction of bandwidth requirements of inter-network traffic flows, in one embodiment, lower-priority inter-network traffic may be reduced in order enable satisfaction of bandwidth requirements of higher-priority inter-network traffic flows. For example, assuming that the prevention of all intra-network traffic still does not provide enough bandwidth on the HN in order to support all of the bandwidth requirements of the inter-network traffic flows, selected ones of the inter-network traffic flows may be temporarily suspended in order to free up additional bandwidth on the HN for supporting others of the inter-network traffic flows (e.g., such as temporarily suspending one or more lower-priority inter-network traffic flows in favor of one or more higher-priority traffic flows).

In one embodiment, temporarily preventing communication of one of the inter-network traffic flows may include determining, for each of the traffic flows, a bandwidth usage of the HN associated with the traffic flow, and in response to a determination that one of the inter-network traffic flows prevents satisfaction of one of the bandwidth requirements, communication associated with that one of the inter-network traffic flows is temporarily reduced or suspended to free up additional bandwidth on the HN for other inter-network traffic flows. The manner in which the inter-network traffic flow is temporarily reduced or suspended may depend on whether that inter-network traffic flow is an ingress inter-network traffic flow or an egress inter-network traffic flow.

In this embodiment, in response to a determination that the selected one of the inter-network traffic flows is an ingress traffic flow (from the AN to the HN), frames of that traffic flow are queued by the GW for later delivery to the intended UT (at a later time when temporary reduction or suspension of communications for that traffic flow expires). In this embodiment, in response to a determination that the selected one of the inter-network traffic flows is an egress inter-network traffic flow (from the HN to the AN), data adapted for temporarily suspending communications associated with the selected one of the inter-network traffic flows is transmitted to the UT from which the selected one of the inter-network traffic flows originates (in order to temporarily prevent the UT from transmitting traffic associated with that inter-network traffic flow over the HN, or reduce the amount of traffic associated with that inter-network traffic flow that is transmitted by the UT over the HN).

Although primarily depicted and described herein with respect to an embodiment in which the home network is implemented as a local area network, the present invention may be utilized for policing bandwidth usage of home networks implemented using various other technologies. Although primarily depicted and described herein with respect to a home network including terminals which communicate with other networks via a residential gateway, the present invention may be utilized for policing bandwidth usage of various other types of networks. Although primarily depicted and described herein with respect to using one or more control frames to control bandwidth usage on the home network, various other backpressure schemes may be used in accordance with the present invention to control bandwidth usage on a home network.

Figure 5:
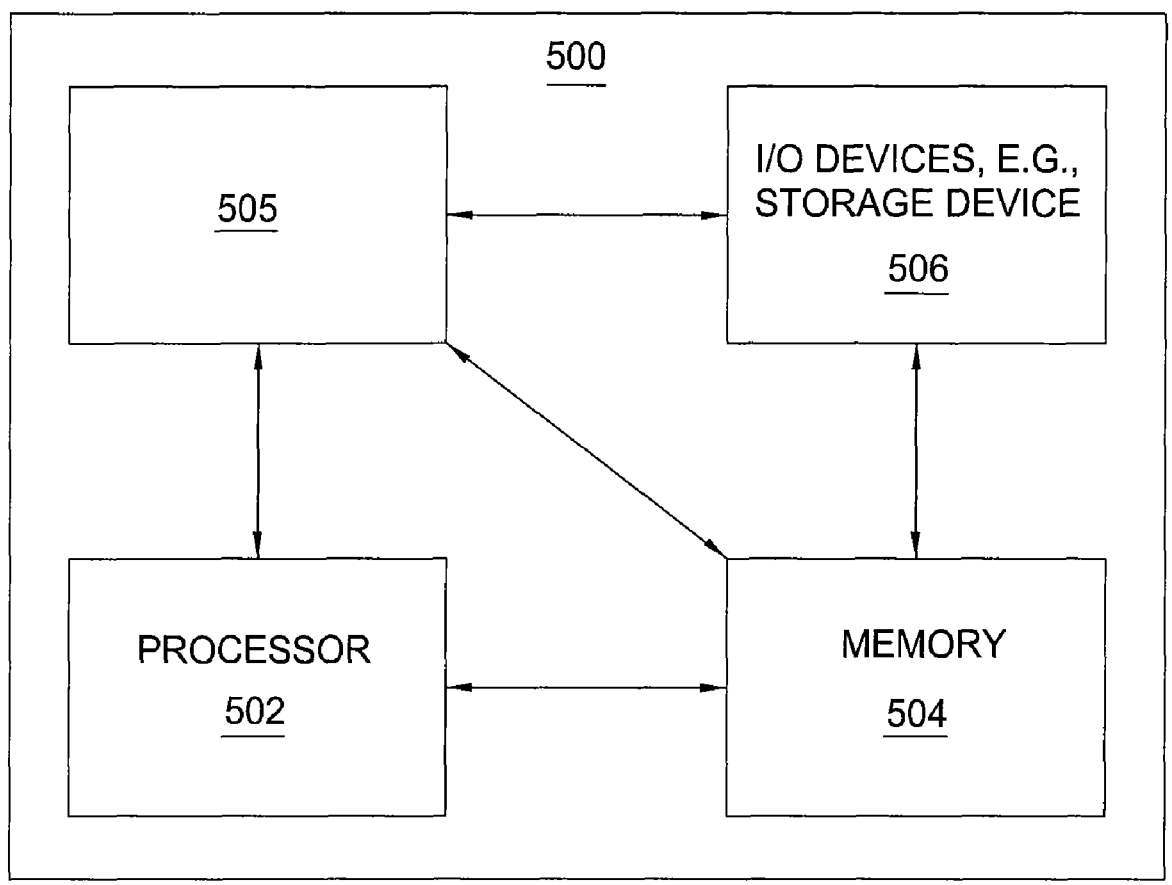
FIG. 5 depicts a high-level block diagram of a general-purpose computer suitable for use in performing at least a portion of the functions described herein.

FIG. 5 depicts a high-level block diagram of a general-purpose computer suitable for use in performing the functions described herein. As depicted in FIG. 5, system 500 comprises a processor element 502 (e.g., a CPU), a memory 504, e.g., random access memory (RAM) and/or read only memory (ROM), a bandwidth usage control module 505, and various input/output devices 506 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

The present invention may be implemented in software and/or in a combination of software and hardware, e.g., using application specific integrated circuits (ASIC), a general purpose computer or any other hardware equivalents. In one embodiment, the present bandwidth usage control module or process 505 can be loaded into memory 504 and executed by processor 502 to implement the functions as discussed above. Thus, bandwidth usage control process 505 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method for policing a first network, the first network comprising a plurality of terminals, the first network associated with a gateway to a second network, the method comprising:

monitoring, by the gateway, bandwidth usage associated with intra-network traffic of the terminals of the first network that is propagated between terminals of the first network;

determining, by the gateway, bandwidth requirements associated with inter-network traffic of the terminals of the first network that is propagated via the second network; and in response to a determination that the bandwidth usage prevents satisfaction of one of the bandwidth requirements, transmitting control data adapted for reducing intra-network traffic in the first network.

2. The method of claim 1, wherein monitoring bandwidth usage associated with intra-network traffic comprises:

receiving intra-network frames placed on the first network by terminals of the first network;

identifying, for each intra-network frame, the terminal from which the intra-network frame originates; and monitoring, for each of the terminals, a respective bandwidth usage measure for the terminal based on the intra-network frames that originate from the terminal.

3. The method of claim 2, wherein monitoring the bandwidth usage measures of the terminals comprises:

for each of the terminals of the first network:

determining, for each intra-network frame transmitted by the terminal, a size of the intra-network frame;

determining, for each intra-network frame transmitted by the terminal, a length of time during which the terminal transmits the intra-network frame; and determining the bandwidth usage measure for the terminal using the frame sizes and the frame transmission times.

4. The method of claim 1, wherein determining bandwidth requirements associated with inter-network traffic comprises:

identifying each of a plurality of inter-network traffic flows of the terminals of the first network, wherein the inter-network traffic flows traverse the second network;

determining, for each of the identified inter-network traffic flows, a priority of the identified inter-network traffic flow; and determining, for each of the identified inter-network traffic flows, the bandwidth requirement of the inter-network traffic flow using the priority of the inter-network traffic flow.

5. The method of claim 4, further comprising:

determining, for each of the inter-network traffic flows, a bandwidth usage of the first network due to the inter-network traffic flow;

in response to a determination that one of the inter-network traffic flows prevents satisfaction of one of the bandwidth requirements, determining whether the one of the inter-network traffic flows is an ingress inter-network traffic flow or an egress inter-network traffic flow; and in response to a determination that the one of the inter-network traffic flows is an ingress inter-network traffic flow, queuing frames of the one of the inter-network traffic flows; or in response to a determination that the one of the inter-network traffic flows is an egress inter-network traffic flow, transmitting, toward the terminal associated with the one of the inter-network traffic flows, control data adapted for preventing the terminal associated with one of the inter-network traffic flows from communicating over the first network.

6. The method of claim 1, wherein transmitting control data adapted for reducing intra-network traffic in the first network comprises:

selecting one of the terminals of the first network; and transmitting, toward the selected one of the terminals, control data adapted for temporarily preventing the selected one of the terminals from communicating over the first network.

7. The method of claim 1, wherein transmitting control data adapted for reducing intra-network traffic in the first network comprises:

selecting one of the terminals of the first network;

identifying one of the terminals for which frames transmitted by the selected one of the terminals over the first network are intended; and transmitting, from the gateway toward the selected one of the terminals, the control data adapted for reducing intra-network traffic in the first network, wherein the control data adapted for reducing intra-network traffic in the first network comprises:

a source address identifying the one of the terminals for which frames transmitted by the selected one of the terminals over the network are intended; and a destination address identifying the selected one of the terminals.

8. The method of claim 1, wherein the control data adapted for reducing intra-network traffic in the first network comprises control data adapted for preventing one of the terminals from communicating over the first network for a predetermined period of time.

9. The method of claim 1, wherein the control data adapted for reducing intra-network traffic in the first network comprises a PAUZE frame.

10. An apparatus for policing a first network having a plurality of terminals, the apparatus configured for operating as a gateway between the first network and a second network, the apparatus comprising:

means for monitoring bandwidth usage associated with intra-network traffic of the terminals of the first network that is propagated between terminals of the first network;

means for determining bandwidth requirements associated with inter-network traffic of the terminals of the first network that is propagated via the second network; and means for transmitting control data in response to a determination that the bandwidth usage prevents satisfaction of one of the bandwidth requirements, wherein the control data is adapted for reducing intra-network traffic in the first network.

11. The apparatus of claim 10, wherein the means for monitoring bandwidth usage associated with intra-network traffic comprises:

means for receiving intra-network frames placed on the first network by terminals of the first network;

means for identifying, for each intra-network frame, the terminal from which the intra-network frame originates; and means for monitoring, for each of the terminals, a respective bandwidth usage measure based on the intra-network frames that originate from the terminal.

12. The apparatus of claim 11, wherein the means for monitoring the bandwidth usage measures of the terminals comprises:
- means for determining, for each intra-network frame, a size of the intra-network frame;
- means for determining, for each intra-network frame, a length of time during which the terminal transmits the intra-network frame; and
- means for determining, for each of the terminals, the bandwidth usage measure for the terminal using the frame sizes and the frame transmission times of the intra-network frames that originate from the terminal.

13. The apparatus of claim 10, wherein the means for determining bandwidth requirements associated with inter-network traffic comprises:
- means for identifying each of a plurality of inter-network traffic flows of the terminals of the first network, wherein the inter-network traffic flows traverse the second network;
- means for determining, for each of the identified inter-network traffic flows, a priority of the identified inter-network traffic flow; and
- means for determining, for each of the identified inter-network traffic flows, the bandwidth requirement of the inter-network traffic flow using the priority of the inter-network traffic flow.

14. The apparatus of claim 13, further comprising:
- means for determining, for each of the inter-network traffic flows, a bandwidth usage of the first network due to the inter-network traffic flow;
- means for determining, in response to a determination that one of the inter-network traffic flows prevents satisfaction of one of the bandwidth requirements, whether the one of the inter-network traffic flows is an ingress inter-network traffic flow or an egress inter-network traffic flow;
- means for queuing frames of the one of the inter-network traffic flows in response to a determination that the one of the inter-network traffic flows is an ingress inter-network traffic flow; and
- means for transmitting control data in response to a determination that the one of the inter-network traffic flows is an egress inter-network traffic flow, wherein the control data is transmitted toward the terminal associated with the one of the inter-network traffic flows, wherein the control data is adapted for preventing the terminal associated with one of the inter-network traffic flows from communicating over the first network.

15. The apparatus of claim 10, wherein the means for transmitting control data adapted for reducing intra-network traffic in the first network comprises:
- means for selecting one of the terminals of the first network; and
- means for transmitting, toward the selected one of the terminals, control data adapted for temporarily preventing the selected one of the terminals from communicating over the first network.

16. The apparatus of claim 10, wherein the means for transmitting control data adapted for reducing intra-network traffic in the first network comprises:
- means for selecting one of the terminals of the first network;
- means for identifying one of the terminals for which frames transmitted by the selected one of the terminals over the first network are intended; and
- means for transmitting, toward the selected one of the terminals, control data adapted for reducing intra-network traffic in the first network, wherein the control data adapted for reducing intra-network traffic in the first network comprises:
  - a source address identifying the one of the terminals for which frames transmitted by the selected one of the terminals over the network are intended; and
  - a destination address identifying the selected one of the terminals.

17. The apparatus of claim 10, wherein the control data adapted for reducing intra-network traffic in the first network comprises control data adapted for preventing one of the terminals from communicating over the first network for a predetermined period of time.

18. The apparatus of claim 10, wherein the control data adapted for reducing intra-network traffic in the first network comprises a PAUZE frame.

19. A method, comprising:
- receiving, at one of a plurality of terminals of a first network, a control frame adapted for temporarily preventing the one of the terminals of the first network from communicating over the first network;
- wherein the control frame is received in response to a determination, by a gateway between the first network and a second network, that a bandwidth usage prevents a bandwidth requirement from being satisfied, wherein the bandwidth usage comprises bandwidth usage associated with intra-network traffic of the terminals of the first network that is propagated between terminals of the first network, wherein the bandwidth requirement is associated with inter-network traffic of the terminals of the first network that is propagated via the second network.

20. The method of claim 19, further comprising:
- in response to the received control frame, preventing the one of the terminals from communicating with other ones of the terminals over the first network for a specified period of time;
- in response to the received control frame, setting a timer adapted for determining a time at which the one of the terminals resumes communications over the first network; and
- if another control frame adapted for preventing the one of the terminals from communicating over the first network is received prior to expiration of the timer, resetting the timer; or
- if another control frame adapted for preventing the one of the terminals from communicating over the first network is not received prior to expiration of the timer, resuming communications over the first network.

* * * * *